(12) United States Patent
Gong

(10) Patent No.: US 12,222,833 B2
(45) Date of Patent: Feb. 11, 2025

(54) METHOD AND DEVICE FOR DETERMINING COVERAGE IN HIL TESTING, AND STORAGE MEDIUM

(71) Applicant: Sungrow Power Supply Co., Ltd., Hefei (CN)

(72) Inventor: Cunhao Gong, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 34 days.

(21) Appl. No.: 18/186,122

(22) Filed: Mar. 17, 2023

(65) Prior Publication Data

US 2023/0305938 A1  Sep. 28, 2023

(30) Foreign Application Priority Data

Mar. 24, 2022  (CN) .......................... 202210294110.8

(51) Int. Cl.
*G06F 11/26*  (2006.01)
*G06F 11/27*  (2006.01)

(52) U.S. Cl.
CPC .......... *G06F 11/27* (2013.01); *G06F 11/3676* (2013.01)

(58) Field of Classification Search
CPC .......................... G06F 11/27; G06F 11/3676
USPC .......................................................... 714/30
See application file for complete search history.

(56) References Cited

U.S. PATENT DOCUMENTS

| | | | |
|---|---|---|---|
| 2016/0305853 A1 | 10/2016 | Senf | |
| 2021/0294944 A1* | 9/2021 | Nassar | G06F 30/27 |
| 2022/0171697 A1* | 6/2022 | Moukahal | G06N 5/048 |
| 2022/0269595 A1* | 8/2022 | Tritchkov | G06F 11/3696 |
| 2022/0334937 A1* | 10/2022 | Jardini | G06F 11/3684 |
| 2022/0358024 A1* | 11/2022 | Bannenberg | G06F 11/3688 |

OTHER PUBLICATIONS

First Examination Report for Australian Patent Application No. 2023201696, dated Oct. 31, 2023.

* cited by examiner

*Primary Examiner* — Chae M Ko
(74) *Attorney, Agent, or Firm* — Wolf, Greenfield & Sacks, P.C.

(57) ABSTRACT

A method and a device for detecting coverage in HIL testing, and a computer-readable storage medium are. The method includes: acquiring an HIL test case and performing HIL testing on a controller based on the HIL test case; for each of functions in code of the controller, detecting a preset mark of the function and acquiring statistical data about the detected preset mark during the HIL testing; and determining coverage of the HIL test case on the functions based on the statistical data about the preset marks. Both the determination of execution and functionality of the function in the code based on the HIL test case as well as the determination of the coverage of the HIL test case based on the execution of the function in the code are performed during the HIL testing.

12 Claims, 2 Drawing Sheets

METHOD AND DEVICE FOR DETERMINING COVERAGE IN HIL TESTING, AND STORAGE MEDIUM

The application claims priority to Chinese Patent Application No. 202210294110.8, titled "METHOD AND DEVICE FOR DETERMINING COVERAGE IN HIL TESTING, AND STORAGE MEDIUM", filed on Mar. 24, 2022, with the China National Intellectual Property Administration, which is incorporated herein by reference in its entirety.

FIELD

The present disclosure relates to the field of testing technologies, and in particular to a method and a device for determining coverage in HIL testing, and a computer-readable storage medium.

BACKGROUND

Nowadays, a certain number of Hardware in Loop (HIL) test cases are usually written to perform HIL testing on a controller, and it is determined, based on the results obtained by executing the test cases, whether functionalities of the controller meet design requirements. Further, analysis relating to a test case that leads to a fail is performed, so as to modify the software in a targeted manner and perform regression testing until all the HIL test cases each already lead to a pass.

However, there are the following problems in the existing HIL testing. It is difficult for a tester to write HIL test cases fully covering code of the controller due to the fact that the HIL testing is essentially black-box testing. That is, it is difficult to check every functionality or function of the controller by testing. For example, a project controller is subject to HIL testing so as to check functionality strategy and failure handling mechanism of the project controller. In this case, the tester writes 1000 test cases to perform the HIL testing on the controller. However, the written HIL test cases may only cover 90% of code of the controller, and other 10% of the code of the controller fail to be checked by testing, resulting in potential dangers to the functionalities of the controller delivered to clients later.

SUMMARY

A method for determining coverage in HIL testing is provided according to the present disclosure in order to solve the technical problem of failure to fully cover code of a controller in the existing HIL testing.

The method for determining coverage in HIL testing includes: acquiring an HIL test case and performing HIL testing on a controller based on the HIL test case; for each of functions in code of the controller, detecting a preset mark of the function and acquiring statistical data about the detected preset mark during the HIL testing; and determining coverage of the HIL test case on the functions based on the statistical data about the preset marks.

In an embodiment, the preset mark includes a function status bit and/or a function execution counter. The method further includes: for each of the functions in code of the controller, adding a preset mark to the function before the performing HIL testing on a controller based on the HIL test case.

In an embodiment, the method further includes: before the determining coverage of the HIL test case on the functions based on statistical data about the preset marks, acquiring a first function sum of all the functions in the code; and acquiring a second function sum of functions whose function status bits and/or function execution counters subjected to a change during the HIL testing.

In an embodiment, the determining coverage of the HIL test case on the functions based on statistical data about the preset marks includes: determining a ratio of the second function sum to the first function sum as the coverage.

In an embodiment, the method further includes: after the determining coverage of the HIL test case on the functions based on statistical data about the preset marks, acquiring a software testing report and an HIL testing report of the HIL test case of the controller.

In an embodiment, the method further includes: after acquiring a software testing report and an HIL testing report of the HIL test case of the controller, modifying at least one of the code of the controller and the HIL test case based on the software testing report and the HIL testing report when the coverage is less than 100%.

In an embodiment, the modifying at least one of the code of the controller and the HIL test case based on the software testing report and the HIL testing report includes: determining an idle function whose function status bit and function execution counter remain unchanged during the HIL testing; determining a cause of the idle function based on the software testing report and the HIL testing report; modifying the code of the controller based on the cause; and/or modifying the HIL test case based on the cause.

In an embodiment, the modifying the code of the controller based on the cause includes: acquiring a current version of the code of the controller; and deleting the idle function from the code if the idle function in the current version is unnecessary for all HIL test cases.

In an embodiment, the modifying the HIL test case based on the cause includes: writing another HIL test case to replace the HIL test case so as to test the idle function if the idle function is essential to all HIL test cases and fails to be tested.

In an embodiment, the further includes: after the modifying at least one of the code of the controller and the HIL test case based on the software testing report and the HIL testing report, returning to the performing HIL testing on a controller until the coverage is equal to 100%.

In addition, a device for detecting coverage in HIL testing is provided according to the present disclosure in order to solve the technical problem of failure to fully cover code of a controller in the existing HIL testing. The device includes a memory, a processor, and a computer program stored in the memory and executable by the processor. The computer program, when executed by the processor, implements the method for determining coverage in HIL testing.

In addition, a computer-readable storage medium is provided according the present disclosure in order to solve the technical problem of failure to fully cover code of a controller in the existing HIL testing. The computer-readable storage medium stores a computer program that, when executed by a processor, implements the method for determining coverage in HIL testing.

A method and a device for detecting coverage in HIL testing, and a computer-readable storage medium are proposed according to the embodiments of the present disclosure. The method includes: acquiring an HIL test case and performing HIL testing on a controller based on the HIL test case; for each of functions in code of the controller, detecting a preset mark of the function and acquiring statistical data about the detected preset mark during the HIL testing;

and determining coverage of the HIL test case on the functions based on the statistical data about the preset marks.

In the present disclosure, the HIL testing on the controller and the software testing on the code of the controller are performed concurrently. The coverage of the HIL test case on the functions is determined based on the statistical data about the preset marks of the functions in the code of the controller. In the HIL testing, the execution of the functions in the code, and the execution functionality of the functions in the code are determined based on the HIL test case. Therefore, the code of the controller is optimized by reducing proportion of "dead function" in the code, thereby reducing redundancy of the code.

Embodiments, functionalities and advantages of the present disclosure are further described below with reference to the drawings.

DETAILED DESCRIPTION OF EMBODIMENTS

It should be understood that the specific embodiments described herein are for explaining merely rather than limiting the present disclosure.

Figure 1:
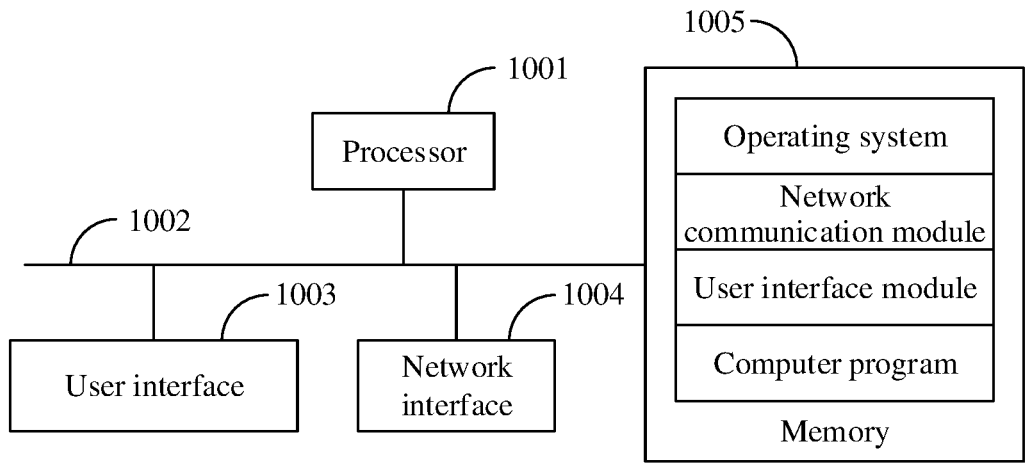
FIG. 1 is a schematic structural diagram illustrating a runtime system involved in technical solutions according to an embodiment of the present disclosure.

Reference is made to FIG. 1, which is a schematic structural diagram illustrating a runtime system involved in technical solutions according to an embodiment of the present disclosure.

As shown in FIG. 1, the runtime system may include: a processor 1001, e.g., a central processing unit (CPU); a communication bus 1002; a user interface 1003; a network interface 1004; and a memory 1005. The processor 1001, the user interface 1003, the network interface 1004, and the memory 1005 communicate with each other through the communication bus 1002. The user interface 1003 may include: a display; and an input unit, e.g., a keyboard. In an embodiment, the user interface 1003 further includes a standard wired or wireless interface. In an embodiment, the network interface 1004 includes a standard wired or wireless interface (e.g., a wireless fidelity (WI-FI) interface). The memory 1005 may be a high-speed random-access memory (RAM); or a stable non-volatile memory (NVM), e.g., a disk memory. In an embodiment, the memory 1005 is a storage device independent of the processor 1001.

Those skilled in the art should understand that the structure shown in FIG. 1 does not constitute a limitation on the runtime system. On the contrary, the runtime system may include more or less components than that shown in the drawings. Alternatively, some components may be combined or components may be arranged differently.

As shown in FIG. 1, the memory 1005, serving as a storage medium, may include an operating system, a data storage module, a network communication module, a user interface module, and a computer program.

In the runtime system shown in FIG. 1, the network interface 1004 is configured to communicate with another device. The user interface 1003 is configured to perform data interaction with a user. The processor 1001 and the memory 1005 may be arranged inside the runtime system. The processor 1001 in the runtime system invokes the computer program stored in the memory 1005 so as to: acquire an HIL test case and perform HIL testing on a controller based on the HIL test case; for each of functions in code of the controller, detect a preset mark of the function and acquire statistical data about the detected preset mark during the HIL testing; and determine coverage of the HIL test case on the functions based on the statistical data about the preset marks.

Further, the preset mark includes a function status bit and/or a function execution counter. The processor 1001 invokes the computer program stored in the memory 1005 so as to: for each of the functions in code of the controller, add a preset mark to the function before the HIL testing is performed on the controller based on the HIL test case.

Further, the processor 1001 invokes the computer program stored in the memory 1005 so as to: acquire a first function sum of all the functions in the code and acquire a second function sum of functions whose function status bits and/or function execution counters subjected to a change during the HIL testing before the coverage of the HIL test case on the functions is determined based on statistical data about the preset marks.

Further, the processor 1001 invokes the computer program stored in the memory 1005 so as to determine the coverage of the HIL test case on the functions based on the statistical data about the preset marks by determining a ratio of the second function sum to the first function sum as the coverage.

Further, the processor 1001 invokes the computer program stored in the memory 1005 so as to acquire a software testing report and an HIL testing report of the HIL test case of the controller after the coverage of the HIL test case on the functions is determined based on the statistical data about the preset marks.

Further, the processor 1001 invokes the computer program stored in the memory 1005 so as to modify at least one of the code of the controller and the HIL test case based on the software testing report and the HIL testing report when the coverage is less than 100%, after the software testing report and the HIL testing report of the HIL test case of the controller are acquired.

Further, the processor 1001 invokes the computer program stored in the memory 1005 so as to modify the at least one of the code of the controller and the HIL test case based on the software testing report and the HIL testing report by: determining an idle function whose function status bit and function execution counter remain unchanged during the HIL testing; determining a cause of the idle function based on the software testing report and the HIL testing report; modifying the code of the controller based on the cause; and/or modifying the HIL test case based on the cause.

Further, the processor 1001 invokes the computer program stored in the memory 1005 so as to modify the code of the controller based on the cause by: acquiring a current version of the code of the controller; and deleting the idle function from the code if the idle function in the current version is unnecessary for all HIL test cases.

Further, the processor 1001 invokes the computer program stored in the memory 1005 so as to modify the HIL test case based on the cause by: writing another HIL test case to replace the HIL test case so as to test the idle function when the idle function is essential to all HIL test cases and fails to be tested.

Further, the processor 1001 invokes the computer program stored in the memory 1005 so as to return to the performing HIL testing on a controller until the coverage is equal to 100% after at least one of the code of the controller and the HIL test case is modified based on the software testing report and the HIL testing report.

Figure 2:
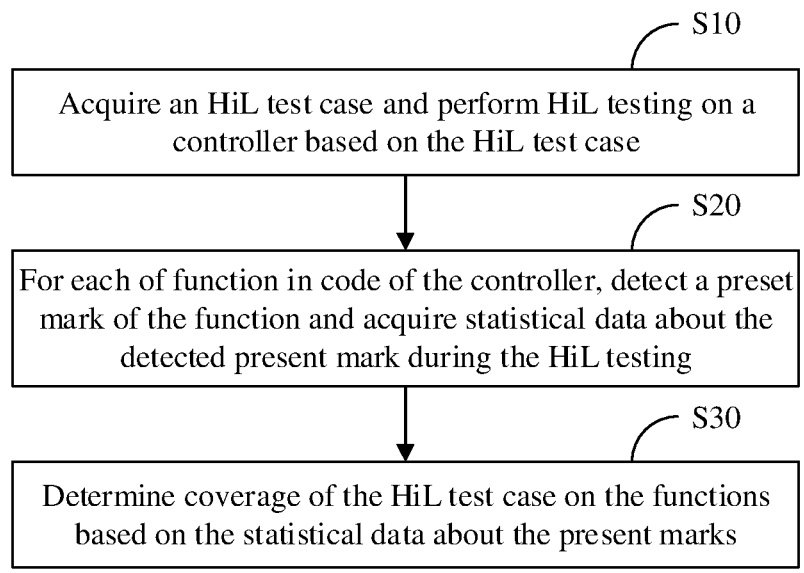
FIG. 2 is a schematic flowchart illustrating a method for determining coverage in HIL testing according to an embodiment of the present disclosure.

A method for determining coverage in HIL testing is provided according to an embodiment of the present disclosure. Reference is made to FIG. 2, which is a schematic flowchart illustrating the method for determining coverage in HIL testing according to a first embodiment of the present disclosure.

In the first embodiment, the method for determining coverage in HIL testing includes the following steps S10 to S30.

In step S10, a HIL test case is acquired, and HIL testing is performed on a controller based on the HIL test case.

In hardware-in-loop simulation, a real controller is connected to a virtual controlled object (simulated by real-time simulation hardware), to fully test the controller efficiently and at low cost. Generally, the premise of HIL testing is that the controller has been developed, and the controller is subject to testing about whether the functionalities of the controller are normal in an ideal or safe environment. In this application scenario, the real-time simulation hardware (or HIL bench) serves as the controlled object, runs the controlled object model, and simulates various faults in real time. In essence, the real-time simulation hardware (or HIL bench) is to simulate the real controlled object as realistically as possible, so as to effectively deceive the controller, making the controller think that it is controlling a real controlled object.

In the first embodiment, the software engineer has completed the code of the controller. Before testing the controller, the HIL testing engineer writes HIL test cases based on the controller that has realized the preset functions. Then, the controller is connected to an HIL simulator through an input/output (I/O) connector, receives an IO signal of each HIL test case in the HIL simulator, and performs the HIL testing on the controller.

In step S20, for each function in the code of the controller, a preset mark of the function is detected and statistical data about the detected mark is acquired during the HIL testing.

The software code is bound to the HIL test case. When the controller executes the HIL test case, execution or invocation of a function in the code of the controller, and even a switch between functions in the code are automatically performed following the execution of the HIL test case.

For each function in the code of the controller, the preset mark of the function is detected and then statistical data about the detected mark is acquired, during the HIL testing based on IO signals of the HIL test case. The preset mark of a function indicates whether the function is executed or invoked, and varies with execution or invocation of the function.

In step S30, the coverage of the HIL test case on the functions is determined based on the statistical data about the preset marks.

When the controller is executing the HIL test case, the execution of a function or switch between functions are automatically performed following the execution of the HIL test case. At the end of the execution of the HIL test case, a relevant unit automatically records the preset marks of the functions involved in executing the HIL test case by the controller, and determine based on the preset marks the coverage of functions being executed or invoked so as to determine which functions are executed or invoked and which are idle. For example, during the execution of the HIL test case, a function 1, a function 2 and a function 3 are executed in parallel, indicating that this HIL test case covers the function 1, the function 2 and the function 3 of tested code. That is, in the first embodiment, in addition to determining the execution of the function in the code based on the HIL test case, the execution functionality of the function is also determined. For example, the target functionality of this HIL test case may be determined as the execution functionality of the function 1, the function 2 and the function 3.

In the first embodiment, the HIL test case is acquired. The HIL testing is performed on the controller based on the HIL test case. For each function in the code of the controller, a preset mark of the function is detected and the statistical data about the preset mark is acquired during the HIL testing. The coverage of the HIL test cases on the functions is determined based on the statistical data about the preset marks.

In the first embodiment, the HIL testing on the controller and software testing on the code of the controller are performed concurrently. The coverage of the HIL test case on the functions is determined based on the statistical data about the preset marks of the functions in the code of the controller. In the HIL testing, the execution and the execution functionality of the function in the code are determined based on the HIL test case. Therefore, the code of the controller is optimized by reducing proportion of "dead function" in the code, thereby reducing redundancy of the code.

In an embodiment, the preset mark may include a function status bit and/or a function execution counter.

Before the HIL testing is performed on the controller based on the HIL test case, the method further includes: adding a preset mark to each function in the code.

The preset mark, e.g., the function status bit and/or the function execution counter, of a function in the code of the controller is detected and then statistical data about the preset mark is acquired, to determine the execution of the function or switch between functions, so as to obtain the test coverage of HIL test case. For example, a function status bit corresponding to a function being invoked or executed is ON, and a function execution counter corresponding to the function being invoked or executed is changed to 1. When the invocation or the execution of the function ends, the function status bit is turned OFF from ON, and the function execution counter remains 1. When another invocation or execution of the function ends, the function status bit is turned OFF from ON again, and the function execution counter is changed to 2.

In this way, the execution and the invocation of a function, as well as switch between functions can be acquired. The execution and the invocation of the function is directly determined based on the function execution counter of the function. The switch between functions is determined based on function execution counters of the functions together. For example, the function execution counters of functions 1, 2 and 3 have values of 6, 2, and 20 respectively, at a moment. Subsequently, the controller responds to an HIL test case, the function execution counters of functions 1, 2 and 3 are changed to 7, 2, and 20 respectively, and then the function execution counters of functions 1, 2 and 3 are changed to 7, 2, and 21 respectively. Therefore, it is determined based on the change of the function execution counters that there is a switch from the function 1 to the function 3.

In an embodiment, before the coverage of the HIL test case on the functions is determined based on the statistical data about the preset marks, the method further includes: acquiring a first function sum of all the functions in the code; and acquiring a second function sum of functions whose function status bits and/or function execution counters subjected to a change during the HIL testing.

The first function sum is obtained by addling all the functions in the code of the controller together. The second function sum is obtained by addling all functions whose function status bits and/or function execution counters subjected to a change during the HIL testing together.

In an embodiment, the coverage of the HIL test case on the functions is determined based on the statistical data about the preset marks as follows. A ratio of the second function sum to the first function sum is determined as the coverage.

For example, when all 100 test cases written in advance have been executed, a function 4 in the code of the controller fails to be tested, and other 99 functions have been successfully tested. Therefore, the tester knows through a host computer UI that the coverage of the 100 HIL test cases is 99%, and then analyze the reason why the function 4 fails to be covered by the 100 HIL test cases.

In an embodiment, after the coverage of the HIL test case on the functions is determined based on the statistical data about the preset marks, the method further includes: acquiring a software testing report and an HIL testing report of the HIL test case of the controller.

When the execution of all the HIL test cases for the controller ends, the relevant analysis unit analyzes, based on the execution of the HIL testing, whether all the functions in the code of the controller each are successfully tested, records a percentage of the successfully tested functions, generates the software testing report, and finally sends the HIL testing report together with the software testing report to the tester. The tester may analyze the coverage of the HIL test case or the functionality of the code based on the HIL testing report and the software testing report.

In an embodiment, after the software testing report and the HIL testing report of the HIL test case of the controller are acquired, the method further includes: modifying at least one of the code of the controller and the HIL test case based on the software testing report and the HIL testing report in when the coverage is less than 100%.

When the execution of all the HIL test cases for the controller ends, the tester finds that a function in the code of the controller fails to be tested, i.e., fails to be executed or invoked, by analyzing the HIL testing report and software testing report of the controller. The tester determines whether this failure is resulted from insufficient coverage of the HIL test case or unnecessary existence of the function in combination with the code of the controller, so as to optimize the code, thereby reducing complexity of the code. If this failure is resulted from the insufficient coverage of the HIL test case, the HIL test case is optimized and the HIL testing is performed again.

In an embodiment, the modification to the at least one of the code of the controller and the HIL test case based on the software testing report and the HIL testing report includes: determining an idle function whose function status bit and function execution counter remain unchanged during the HIL testing; determining a cause of the idle function based on the software testing report and the HIL testing report; modifying the code of the controller based on the cause; and/or modifying the HIL test case based on the cause.

The idle function whose function status bit and function execution counter remain unchanged during the HIL testing is determined and the cause of the idle function is acquired based on the software testing report. The idle function is resulted from the fact that in the current version the HIL testing can be successfully performed based on all the HIL test cases without the idle function. Alternatively, the idle function is resulted from insufficient coverage of the HIL test cases on the functions.

That is, a function whose functionality is unnecessary in the current version becomes the idle function, or the insufficient coverage of the HIL test cases results in the idle function. At least one of the code of the controller and/or HIL test case is modified based on the cause of the idle function, thereby improving the coverage in the HIL testing.

In an embodiment, the modification to the code of the controller based on the cause includes: acquiring the current version of the code of the controller; and deleting the idle function in the current version, if unnecessary for all the HIL test cases, from the code.

If the idle function is resulted from the fact that in the current version the HIL testing can be successfully performed based on all the HIL test cases without the idle function, the idle function is directly removed from the code.

In an embodiment, the HIL test case is modified based on the cause as follows.

If the idle function is essential to all the HIL test cases and fails to be tested, another HIL test case is written to replace the HIL test case, so as to test the idle function.

If the idle function is resulted from the insufficient coverage of the HIL test case on the functions, another HIL test case is written to replace the HIL test case, so as to test the idle function.

In an embodiment, after at least one of the code of the controller and the HIL test case is modified based on the software testing report and the HIL testing report, the method further includes: returning to the performing the HIL testing on the controller until the coverage is equal to 100%.

At least one of the code of the controller and the HIL test case is modified based on the cause of the idle function, and then the HIL testing is performed until the coverage is equal to 100%. The coverage of the HIL test case is greatly improved in the HIL testing according to the first embodiment compared with the existing HIL testing. The code of the controller is executed during the HIL testing, and switch between functions in the code is recorded and analyzed to determine whether all the functions in the code are successfully covered, thereby improving reliability of the code. In addition, the useless function in the code is found, so as to optimize the code in a targeted manner, thereby improving readability of the code and reducing the complexity and redundancy of the code.

That is, both the determination of execution and functionality of the function in the code based on the HIL test case as well as the determination of the coverage of the HIL test case based on the execution of the function in the code are performed during the HIL testing. Therefore, compared with the existing solution, the coverage of the HIL test case on the functions is increased, the code of the controller is optimized, thereby reducing the proportion of "dead function" in the code and the redundancy of the code.

Figure 3:
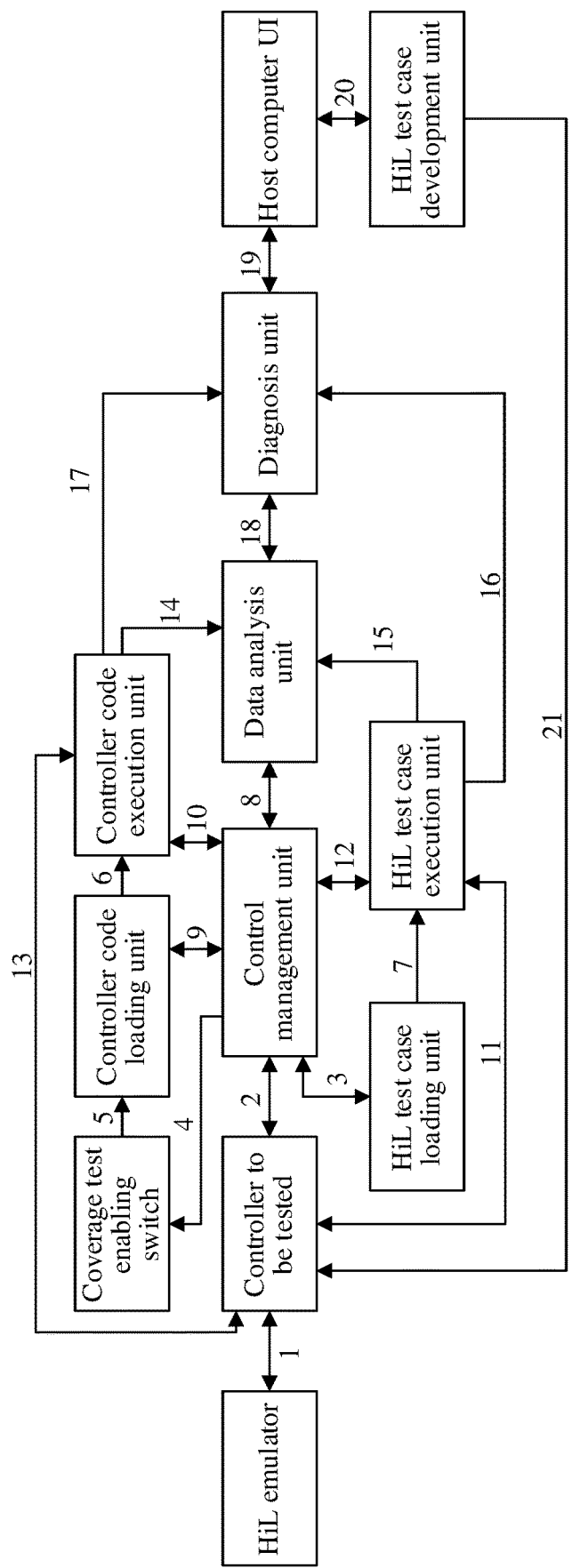
FIG. 3 is a schematic diagram illustrating an architecture for the method for determining coverage in HIL testing according to an embodiment of the present disclosure.

Reference is made to FIG. 3, which is a schematic diagram illustrating an architecture for the method for determining coverage in HIL testing according to an embodiment of the present disclosure.

At the beginning of the testing, the tester connects a controller to be tested through step 1 to the HIL simulator through the communication bus. That is, the analog TO, and the digital IO are hardwired to the HIL simulator. The controller to be tested, when being successfully connected to the HIL emulator, transmits a connection confirmation signal to a control management unit through step 2.

The control management unit is configured to manage and schedule loading and execution of the test case, and exchange a test request, confirmation information and a testing report to an upper unit. The data management unit, when receiving the connection confirmation signal transmitted by the controller to be tested, transmits a test request instruction to a data analysis unit through step 8.

The data analysis unit is configured to analyze, during the HIL testing on the controller, whether all the functions in the code of the controller are successfully tested, record the percentage of functions that have been successfully tested, and transmit an analysis report and an interactive test request to an upper unit. The data analysis unit, when receiving the test request instruction from the control management unit, transmits the test request instruction to a diagnosis unit through step 18.

The controller, when having a serious fault (error) during the testing, transmits a fault code to the diagnostic unit through a corresponding unit. The diagnostic unit is configured to analyze a cause of the fault based on the fault code, and transmits the cause to the host computer UI through step 19, and forwards request information from a lower unit to the host computer UI through step 19. That is, the diagnostic unit forwards the test request instruction from the data analysis unit to the host computer UI through step 19.

The tester confirms, through the host computer UI, that the controller to be tested has been successfully connected to the HIL simulator and is ready for testing. The tester sends a functionality instruction for starting the testing to the control management unit through the host computer UI. This functionality instruction is transmitted to the diagnostic unit through step 19. The diagnostic unit transmits the functionality instruction to the data analysis unit through step 18. The data analysis unit transmits the functionality instruction to the control management unit through step 8.

The control management unit, when receiving the functionality instruction for starting the testing from the host computer UI, loads the HIL test case by the HIL test case loading unit into the test process through step 3. The HIL test case loading unit feeds back loading completion confirmation information to the control management unit through step 3. The HIL test case loading unit is configured to load the HIL test case written by the tester. The control management unit enables a coverage test enabling switch through step 4.

When the coverage test enabling switch is enabled, the controller performs the HIL testing so as to determine the coverage of the HIL test case according to the present application. When the coverage test enabling switch is disenabled, the controller performs traditional HIL testing. Whether the coverage test enabling switch is enabled depends on the testing requirements of the tester.

The coverage test enabling switch, when enabled, transmits an enable signal to a controller code loading unit through step 5. The controller code loading unit loads the code of the controller into the test process through step 9. The controller code loading unit is configured to load the code of the controller to be tested. The controller code loading unit feeds back the loading completion confirmation information to the control management unit through step 9.

The control management unit, when receiving the loading completion confirmation information from the HIL test case loading unit through step 3 and the loading completion confirmation information from the controller code loading unit through step 9, feeds back request information for starting the test to the HIL test case loading unit and the controller code loading unit through steps 3 and 9, respectively.

The HIL test case loading unit, when receiving the request information sent by the control management unit, loads the HIL test case to an HIL test case execution unit through step 7 for testing. The HIL test case execution unit transmits a feedback to the control management unit through step 12 so as to wait for testing.

The controller code loading unit, when receiving the request information sent by the control management unit, loads the controller code to a controller code execution unit through step 9 for testing. The controller code execution unit transmits a feedback to the control management unit through step 10 so as to wait for testing.

The control management unit, when receiving a waiting test execution request through steps 10 and 12, transmits a status request to for starting the testing to the controller code execution unit and the HIL test case execution unit through steps 10 and 12 respectively. The controller code execution unit, when receiving the request from the control management unit, synchronizes a keeping clock signal with the HIL test case execution unit through software synchronization. The HIL test case execution unit executes the HIL test case when receiving the request from the control management unit.

During the execution of the HIL test case, the controller code execution unit performs data interaction with the controller through step 13, and the HIL test case execution unit performs data interaction with the controller through step 11. The controller code execution unit transmits a test result of each test case to the data analysis unit through step 14. The HIL test case execution unit transmits the test result of each test case to the data analysis unit through step 15.

When the HIL test case is fully executed already, the control management unit transmits the testing report to the data analysis unit through step 8. The data analysis unit analyzes whether the current HIL test case has sufficiently covered all functions in the code of the controller and determines the percentage of tested functions based on the testing report sent by the control management unit, the test result sent by the controller code execution unit and the test result sent by the HIL test case execution unit. Finally, the test result is transmitted to the host computer UI through step 19 after being forwarded by the diagnostic unit through step 18. The tester may know the testing status of the controller through the host computer UI.

The tester, when finding that the current HIL test case is insufficient to cover all functions in the code of the controller, invokes an HIL test case development unit through step 20 to write a "patch" test case. In the next testing (regression testing), the HIL test case development unit executes the "patch" test case through step 21 to interact with the controller. Only "patch" test case is executed, thereby reducing the number of test cases for regression testing, and improving the efficiency of regression testing.

The controller code execution unit, when having a fault during the testing, transmits fault code information to the diagnosis unit through step 17. The diagnosis unit, when receiving the fault code information, analyzes the cause of the fault and transmits the analysis result to the host computer UI through step 19. The tester troubleshoots the fault based on the cause fed back from the host computer UI and reschedules the testing.

The HIL test case execution unit, when having a fault during the testing, transmits fault code information to the diagnosis unit through step 16. The diagnosis unit, when receiving the fault code information, analyzes the cause of the fault and transmits the analysis result to the host computer UI through step 19. The tester troubleshoots the fault based on the cause fed back from the host computer UI and reschedules the testing.

The above embodiment is applied to a case as follows.

The tester is to perform HIL testing on a controller A due to a project requirement, and has written 100 HIL test cases to verify the functionality and fault handling strategy of the controller A. The code of the controller A includes 100 functions.

The tester first correctly connects the controller A to the HIL emulator, sends test request information to the host computer UI through the control management unit, and issues an instruction to execute the testing when receiving the information through the host computer UI. The control management unit controls the HIL test case loading unit to load the HIL test cases, that is, the 100 test cases completed by the tester, and controls the controller code loading unit to load the code of the controller. Finally, the control management unit executes the "testing execution" instruction so as to execute the HIL test cases.

During the testing, the data analysis unit collects the execution results of the HIL test case and the code of the controller in real time. For example, a function 1, a function 2 and a function 3 are executed in parallel during the execution of an HIL test case, indicating that the HIL test case covers function 1, the function 2 and the function 3 in the code.

When all the 100 test cases are already executed, the control management unit transmits the testing report to the data analysis unit. The data analysis unit analyzes whether all the 100 functions in the code have been tested and counts the percentage of the functions that have been tested, and transmits an analysis result to the host computer UI for feedback to the tester.

The tester, when receiving the test result, determines whether all the functions in the code have been tested. In a case of a function not tested, the tester analyzes whether the function not tested is resulted from the insufficient coverage of the HIL test cases or a fact that the function is unnecessary for this version. When the function not tested is resulted from the insufficient coverage of the HIL test cases, another HIL test case regarding the function not tested is written for testing. When the function not tested is resulted from the fact that the function is unnecessary for this version, the function is removed from the code of the controller, thereby reducing the complexity and redundancy of the code.

For example, a function 4 in the code of the controller has not been tested and other 99 functions have been successfully tested when all the 100 HIL test cases are executed already, the tester knows through the host computer UI that the coverage of the 100 HIL test cases is 99%, and analyzes the reason why the function 4 is not covered, and performs follow-up operations in the above-mentioned manner.

In addition, a device for determining coverage in HIL testing is provided according to an embodiment of the present disclosure. The device includes a memory, a processor, and a computer program stored in the memory and executable by the processor. The computer program, when executed by the processor, implements the method for determining coverage in HIL testing.

In addition, a computer-readable storage medium is provided according to an embodiment of the present disclosure. The computer-readable storage medium stores a computer program that, when executed by a processor, implements the method for determining coverage in HIL testing.

It should be noted that, the term "including", "comprising" or any other variation thereof herein is intended to be non-exclusive. Therefore, a process, method, article, or system that includes a set of elements includes not only those elements, but also other elements not expressly listed, or elements inherent for such process, method, article, or system. Without further limitations, an element defined by the phrase "comprising a . . . " does not preclude the presence of additional identical elements in the process, method, article or system comprising that element.

The serial numbers of the above embodiments of the present disclosure are for description only, rather than indicate the advantages and disadvantages of the embodiments.

Through the description of the above embodiments, those skilled in the art can clearly understand that the method according to the above embodiments may be implemented by software plus a necessary general-purpose hardware platform, or by hardware. The software plus a necessary general-purpose hardware platform is preferable to the hardware in most cases. Based on such understandings, the essence of the technical solution of the present disclosure or the part that contributes to the conventional may be embodied in the form of a software product. The computer software product is stored in a storage medium (such as a ROM/RAM, a magnetic disk and an optical disk) as described above, and includes several instructions to cause a terminal device (e.g., a mobile phone, a computer, a server, or a network equipment) to perform the method described in various embodiments of the present disclosure.

Only preferred embodiments of the present disclosure are described above, which are not intended to limit the scope of the present disclosure. Any equivalent structure or equivalent process transformation made based on the contents of the description and drawings of the present disclosure, or directly or indirectly used in other related technical fields, is also included in the scope of protection of the present disclosure.

The invention claimed is:

1. A method for determining coverage in HIL testing, comprising:
  acquiring a Hardware in Loop (HIL) test case and performing HIL testing on a controller based on the HIL test case;
  for each of functions in code of the controller, detecting a preset mark of the function and acquiring statistical data about the detected preset mark during the HIL testing; and
  determining coverage of the HIL test case on the functions based on the statistical data about the preset marks.

2. The method for determining coverage in HIL testing according to claim 1, wherein the preset mark comprises at least one of a function status bit and a function execution counter, and
  wherein the method for determining coverage in HIL testing further comprises: for each of the functions in code of the controller, adding a preset mark to the function before the performing HIL testing on a controller based on the HIL test case.

3. The method for determining coverage in HIL testing according to claim 1, further comprising:
  before the determining coverage of the HIL test case on the functions based on statistical data about the preset marks,
  acquiring a first function sum of all the functions in the code; and acquiring a second function sum of functions whose function status bits and/or function execution counters subjected to a change during the HIL testing.

4. The method for determining coverage in HIL testing according to claim 3, wherein the determining coverage of the HIL test case on the functions based on statistical data about the preset marks comprises:
   determining a ratio of the second function sum to the first function sum as the coverage.

5. The method for determining coverage in HIL testing according to claim 1, further comprising:
   after the determining coverage of the HIL test case on the functions based on statistical data about the preset marks,
   acquiring a software testing report and an HIL testing report of the HIL test case of the controller.

6. The method for determining coverage in HIL testing according to claim 5, further comprising:
   after acquiring a software testing report and an HIL testing report of the HIL test case of the controller,
   modifying at least one of the code of the controller and the HIL test case based on the software testing report and the HIL testing report when the coverage is less than 100%.

7. The method for determining coverage in HIL testing according to claim 6, wherein the modifying at least one of the code of the controller and the HIL test case based on the software testing report and the HIL testing report comprises:
   determining an idle function whose function status bit and function execution counter remain unchanged during the HIL testing;
   determining a cause of the idle function based on the software testing report and the HIL testing report;
   modifying the code of the controller based on the cause; and/or
   modifying the HIL test case based on the cause.

8. The method for determining coverage in HIL testing according to claim 7, wherein the modifying the code of the controller based on the cause comprises:
   acquiring a current version of the code of the controller; and
   deleting the idle function from the code if the idle function in the current version is unnecessary for all HIL test cases.

9. The method for determining coverage in HIL testing according to claim 7, wherein the modifying the HIL test case based on the cause comprises:
   writing another HIL test case to replace the HIL test case so as to test the idle function if the idle function is essential to all HIL test cases and fails to be tested.

10. The method for determining coverage in HIL testing according to claim 9, further comprising:
    after the modifying at least one of the code of the controller and the HIL test case based on the software testing report and the HIL testing report,
    returning to the performing HIL testing on a controller until the coverage is equal to 100%.

11. A device for determining coverage in HIL testing, comprising:
    a memory;
    a processor; and
    a computer program stored in the memory and executable by the processor, wherein the computer program is for implementing the method for determining coverage in HIL testing according to claim 1.

12. A non-transitory computer-readable storage medium storing a computer program that, when being executed by a processor, implements the method for determining coverage in HIL testing according to claim 1.

* * * * *